Figure 1:
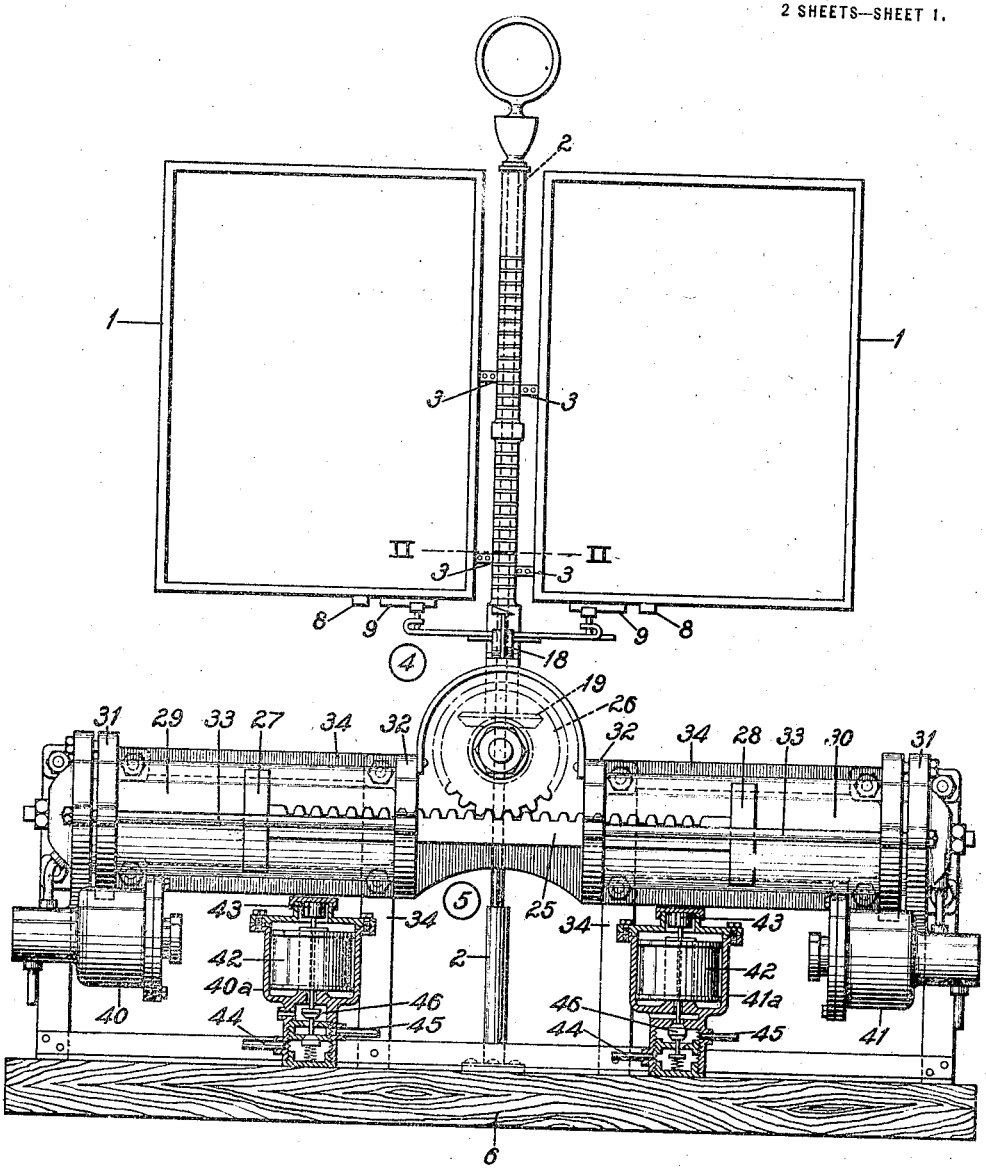

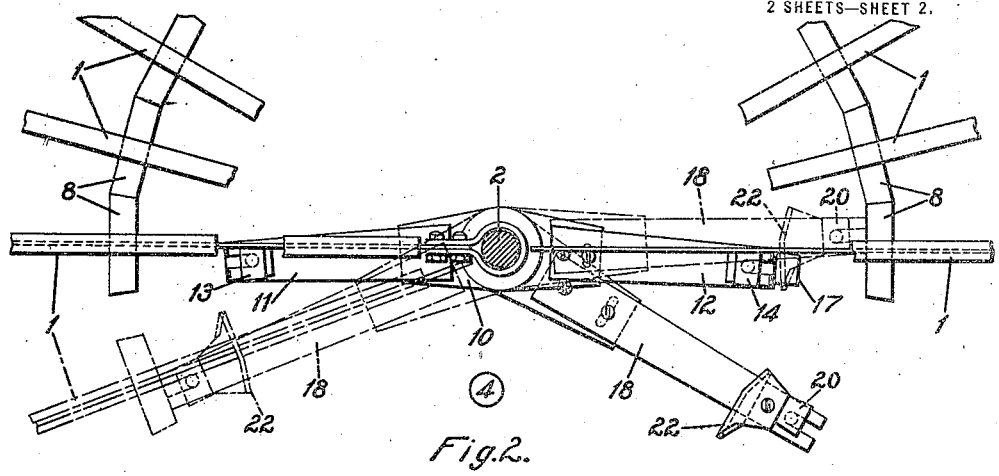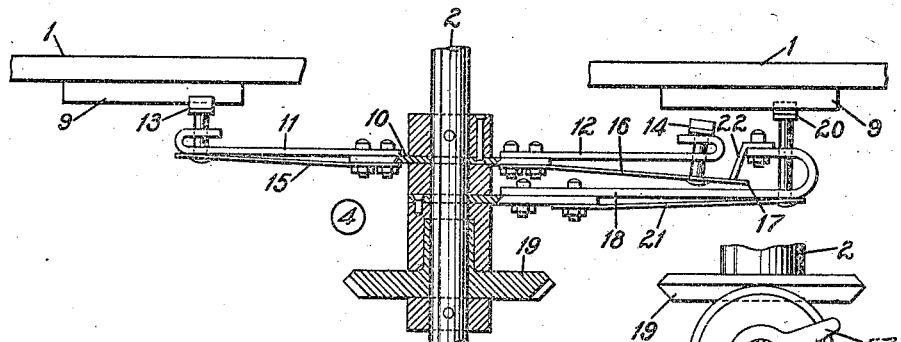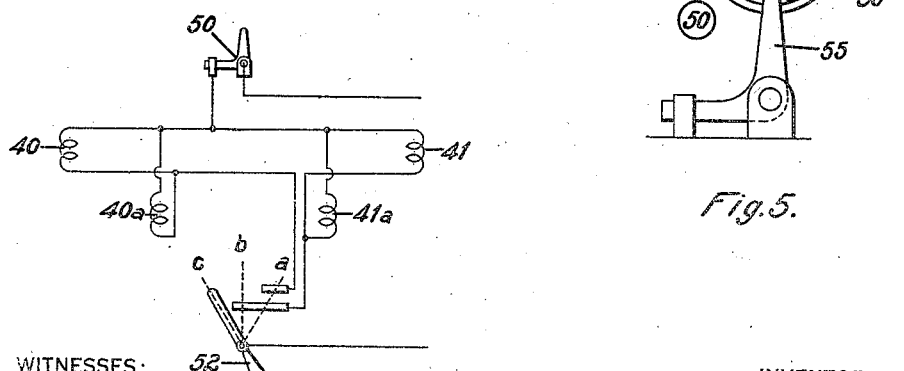

UNITED STATES PATENT OFFICE.

ARTHUR J. HALL AND CHARLES C. WHITTAKER, OF WILKINSBURG, PENNSYLVANIA, ASSIGNORS TO WESTINGHOUSE ELECTRIC AND MANUFACTURING COMPANY, A CORPORATION OF PENNSYLVANIA.

DEMONSTRATING DEVICE.

1,378,024.     Specification of Letters Patent.     Patented May 17, 1921.

Application filed November 3, 1916. Serial No. 129,286.

*To all whom it may concern:*

Be it known that we, ARTHUR J. HALL, a subject of the King of England, and a resident of Wilkinsburg, in the county of Allegheny and State of Pennsylvania, and CHARLES C. WHITTAKER, a citizen of the United States, and a resident of Wilkinsburg, in the county of Allegheny and State of Pennsylvania, have invented a new and useful Improvement in Demonstrating Devices, of which the following is a specification.

Our invention relates to demonstrating devices and particularly to a mechanism for demonstrating the operation of fluid-actuated controllers and the like or for use as an advertising device.

One object of our invention is to provide a device of the above-indicated character which will clearly demonstrate the operation of fluid motors such as are employed for use in operating drum controllers.

Another object of our invention is to provide a device which will attract and hold the attention of observers by its operation.

Another object of our invention is to provide a plurality of leaves which are automatically turned by the action of a reciprocating motor.

A further object of our invention is to provide a fluid-actuated motor which may be stopped or operated in a reverse direction from any operating position.

Our invention employs a fluid-operated motor having transparent cylinders for turning a plurality of rotatably-mounted leaves.

Figure 1 of the accompanying drawings is an elevational view of the apparatus herein described; Fig. 2 is a plan view of the leaf-turning mechanism taken on the line 2—2 of Fig. 1; Fig. 3 is a detailed elevational and sectional view of the leaf-turning device; Fig. 4 is a diagrammatic view of the control system employed for operating the device shown in Fig. 1; and Fig. 5 is an elevational view of an auxiliary switch used in conjunction with the invention.

The device illustrated in the drawings comprises a plurality of rotatably-mounted leaves 1 which are respectively mounted upon a vertical shaft 2 by means of bearings 3. a leaf-turning mechanism 4, and a fluid-operated motor 5. Each of the leaves 1 is provided with stops 8 which engage one with another to space the leaves and with downwardly-extending lugs 9 which coöperate with the leaf-turning mechanism 4, as hereinafter set forth. The leaf-turning mechanism 4 comprises a supporting member 10 that is rigidly mounted on the shaft 2 and is provided with adjustably-mounted arms 11 and 12 which have latches 13 and 14 respectively mounted at the free ends of the arms. The latches 13 and 14 are respectively mounted upon springs 15 and 16 which hold the same in resilient engagement with the lugs 9. The outer end of the spring 16 is provided with an extended portion 17 for a purpose hereinafter set forth. An arm 18 is adjustably secured to a rotatably-mounted driving wheel 19 and is adapted to be oscillated thereby. The outer end of the arm 18 is provided with a latch 20 which is adapted to engage a lug 9 and is held in yielding engagement therewith by a spring 21. The outer end of the arm is bent backwardly and provided with a downwardly-projecting cam 22 which engages the end portion 17 of the spring 16 and operates to depress the latch 14 for certain operative positions of the arm 18. The reciprocating motor 5 is adapted to oscillate the arm 18 by a rack 25 and a pinion 26 which, in turn, drives the pinion 19. The fluid motor 5 is of a balanced-pressure type having opposed pistons 27 and 28 that are respectively mounted within transparent cylinders 29 and 30. The cylinders 29 and 30 are held in place between end pieces 31 and 32 by bolts 33 and a supporting frame 34. Magnet valves 40 and 41 are respectively adapted to admit fluid to the cylinders 29 and 30. Auxiliary valves 40ª and 41ª, which respectively correspond to the valves 40 and 41, are mounted upon the base 6 and are adapted to be operated in parallel relation with the valves 40 and 41. The metal casing of each of the auxiliary valves 40ª and 41ª is cut away to clearly show to the observer the operation of the working parts. The magnetizing coils 42 are left intact in order that the auxiliary valves may be caused to operate at the same time that the corresponding main valves are operated. The valves 40 and 40ª are standard valves and each comprises a magnetizing coil 42, an armature 43 which is actuated by the coil 42, a fluid-supply pipe 44, a pipe 45 which conducts fluid to the operated apparatus, and valve members 46 which are actuated by the movement of the armature 43 and are adapted to admit fluid to the pipe 45 when the coil 42 is energized and to establish connection with the atmosphere from the pipe 45 when the coil is deënergized. The magnet valves 41 and 41ª are of an inverted type and are adapted to admit fluid to the supply pipe 45 when the coil 42 is deenergized and to establish connection to the atmosphere from the pipe 45 when the coil is energized. Fig. 4 illustrates a control system in which a switch 50 is automatically operated by the movement of the fluid motor 5 to alternately energize and deënergize the magnet valves 40 and 41. The coils for the demonstrating valves 40ª and 41ª are connected in parallel-circuit relation with the magnet valves 40 and 41 and are, therefore, similarly actuated. A manually-operated switch 52 is provided with three positions, indicated by the dotted lines a, b, and c, for respectively connecting the magnet valves 40 and 41 in parallel-circuit relation, for interrupting the circuit for the magnet valve 40 and maintaining the circuit for the magnet valve 41, and for interrupting the circuits for both valves. The switch 50 has an outwardly-extending arm 55 which is engaged by lugs 56 and 57 to alternately open and close the switch 50 in accordance with the position of the pistons 27 and 28.

The device here illustrated and described is started into operation by closing the switch 52 to position a. This energizes the magnet valves 40 and 41 and admits fluid, under pressure, from the valve 40 to the cylinder 29 and thereby forces the piston to the right, as shown in the drawings. Since the energization of the valve 41 establishes a connection from the cylinder to the atmosphere, the piston will continue to move to the right until the cam 57 engages the projection 55 and interrupts the energizing circuit for the valves 40 and 41 at the switch 50. As soon as the energizing circuit is interrupted, the valve 41 admits pressure to the cylinder 30 and forces the piston 28 to the left. The valve 40 establishes connection from the cylinder 29 to the atmosphere. The rack 25 will, therefore, move to the left until the arm 56 engages the projection 55 and closes the switch 50, when another cycle of operations of the motor 3 will begin. The reciprocating movement of the rack 25 oscillates the arm 18. When the arm 18 moves to the right, as shown in dotted lines on Fig. 2 of the drawings, the cam 22 will depress the end 17 of the spring 16, and the latch 20 will slide under and be ready to engage a lug 9. The depression of the spring-end 17 causes the latch 14 to be disengaged from the lug 9 and permits the latch 20 to withdraw the leaf 1 and rotate the same to the left to engagement with the latch 13, upon the return movement of the arm 18, as indicated by dotted lines. After the latch 13 has engaged the leaf 1, the latch 20 is disengaged from the leaf as the arm 18 is moved in a reverse direction. The range of travel of the arm 18 is such that, as each leaf is rotated to engagement with the latch 13, the entire set of leaves is moved forward, in opposition to the friction of the resiliently mounted latch, to a point where the two exposed leaves assume the initial alined position that is illustrated in Fig. 2. Consequently, as each leaf is moved, the entire group of leaves is reset to the proper position. In this way, the leaves are successively moved from right to left, or vice versa, and the observer may read such material as is deemed advisable to have presented upon these leaves. It will, therefore, be understood that this device may be employed for demonstrating the operation of the form of fluid motor herein described or may be used as an advertising device to attract attention to the leaves 1.

Although we have described a particular embodiment of our invention, we desire that only such limitations shall be imposed as are indicated in the appended claims.

We claim as our invention:

1. A device comprising a plurality of leaves, and means for turning said leaves one at a time comprising a fluid motor having a transparent cylinder, a piston mounted within said cylinder, and an electrically controlled valve for admitting fluid to said cylinder.

2. A device comprising a plurality of rotatably-mounted leaves, and oscillating means for turning said leaves comprising a fluid-actuated piston, a transparent cylinder in which said piston operates, and means for admitting fluid to said cylinder for actuating said piston.

3. A leaf-turning device comprising a plurality of leaves, oppositely-extending rigid arms, a resiliently-mounted latch at the end of each of said arms, an oscillatable arm having a cam adapted to release one of said latches, and a latch on said oscillatable arm adapted to engage one of said leaves and move the same forwardly to engagement with the latch on the other of said arms, said oscillatable arm being adapted to be disengaged from said leaf upon the backward movement of said arm.

4. A device comprising a plurality of rotatably-mounted leaves, latches for holding said leaves in place, and an oscillating arm for turning said leaves comprising a resiliently-mounted latch, and means for withdrawing one of said first-named latches and permitting said resiliently-mounted latch to engage said leaf, said resiliently-mounted latch being adapted to force said leaf behind another of said first named latches.

5. A device for turning rotatably-mounted leaves comprising a rigidly-mounted arm having a resiliently-mounted latch at the end thereof, said latch having an outwardly-extending lug, an oscillatable arm, a cam on the end of said oscillatable arm adapted to engage said lug and thereby withdraw said first-named latch, a latch on the end of said oscillatable arm adapted to engage one of said leaves and withdraw the same from said first-named latch.

6. The combination with a base, and a plurality of rotatable leaves supported by said base, of a fluid-actuated motor mounted upon said base and adapted to rotate said leaves, said motor comprising a transparent cylinder, a piston disposed within said cylinder, a plurality of magnet valves for admitting fluid to said motor, and an auxiliary magnet valve cut away to show the working parts of one of said valves mounted upon said base.

7. The combination with a fluid-operated motor, and a magnet valve having an energizing coil for admitting fluid to said motor, of an auxiliary magnet valve cut away to show the working parts of said first valve, said auxiliary valve having an energizing coil in circuit with said first coil.

8. The combination with a fluid-operated motor, and a valve for admitting fluid to said motor, of means for demonstrating the operation of said motor, said means comprising a transparent cylinder for said motor, an auxiliary valve cut away to show the working parts of said first valve, and a plurality of rotatable leaves having explanatory legends.

9. The combination with a fluid-operated motor comprising a piston, and a magnet valve having an energizing coil for admitting fluid to said motor, of means for demonstrating the operation of said motor, said means comprising a transparent cylinder for said piston, an auxiliary valve cut away to show the working parts of said first valve, said auxiliary valve having an energizing coil in circuit with said first coil, and a plurality of rotatable leaves, and means for successively interrupting and establishing the circuit of said coils to operate said valves and said motor, and to rotate said leaves.

In testimony whereof, we have hereunto subscribed our names this 25th day of Oct., 1916.

ARTHUR J. HALL.
CHARLES C. WHITTAKER.